(12) United States Patent
Yabe et al.

(10) Patent No.: US 8,050,676 B2
(45) Date of Patent: Nov. 1, 2011

(54) COMMUNITY MANAGEMENT SERVER, COMMUNICATION TERMINAL, CONTENT TRANSMISSION SYSTEM, AND CONTENT TRANSMISSION METHOD

(75) Inventors: Toshiyasu Yabe, Yokohama (JP); Tomoyoshi Oono, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 1014 days.

(21) Appl. No.: 11/937,082

(22) Filed: Nov. 8, 2007

(65) Prior Publication Data
US 2008/0113668 A1    May 15, 2008

(30) Foreign Application Priority Data
Nov. 13, 2006    (JP) ................ P2006-307072

(51) Int. Cl.
*H04W 4/00* (2009.01)
(52) U.S. Cl. .............. 455/435.1; 455/410; 455/435.2; 455/435.3
(58) Field of Classification Search ........... 455/435.1, 455/435.2, 435.3, 410, 411; 713/163
See application file for complete search history.

(56) References Cited

U.S. PATENT DOCUMENTS

| | | | | |
|---|---|---|---|---|
| 7,483,958 B1* | 1/2009 | Elabbady et al. | ............ | 709/217 |
| 7,778,927 B2* | 8/2010 | Kawakami | ............ | 705/59 |
| 2004/0198308 A1* | 10/2004 | Hurst et al. | ............ | 455/403 |
| 2004/0205168 A1 | 10/2004 | Asher | | |
| 2005/0131953 A1* | 6/2005 | Sugiyama et al. | ............ | 707/104.1 |
| 2005/0188399 A1* | 8/2005 | Tischer | ............ | 725/34 |
| 2005/0227678 A1* | 10/2005 | Agrawal et al. | ............ | 455/414.3 |
| 2006/0200534 A1* | 9/2006 | Nagai et al. | ............ | 709/212 |
| 2006/0218181 A1* | 9/2006 | Jeon | ............ | 707/103 R |
| 2007/0239867 A1* | 10/2007 | Belimpasakis et al. | ........ | 709/224 |

FOREIGN PATENT DOCUMENTS

| | | |
|---|---|---|
| JP | 2001-283071 | 10/2001 |
| JP | 2003-132232 | 5/2003 |
| JP | 2004-172818 | 6/2004 |
| JP | 2005-4263 | 1/2005 |
| JP | 2005-228122 | 8/2005 |
| JP | 2006-39832 | 2/2006 |

* cited by examiner

*Primary Examiner* — Kent Chang
*Assistant Examiner* — Ronald Eisner
(74) *Attorney, Agent, or Firm* — Oblon, Spivak, McClelland, Maier & Neustadt, L.L.P.

(57) ABSTRACT

Direct content redistribution between users belonging to the same community is enabled. A portable telephone set issues a request to a community management server to register portable telephone sets belonging to a community, in association with the community, and the community management server performs community registration. The portable telephone sets issue requests to the community management server for permission to redistribute content which has been distributed from a CP server, and when the redistribution permission request is for registered portable telephone sets belonging to the same community, the community management server grants permission for the redistribution. By this means, content redistribution can be performed directly between users belonging to the same community, without the intervention of the CP server.

6 Claims, 16 Drawing Sheets

Fig.8

| PORTABLE TELEPHONE SET | COMMUNITY | COMMUNITY OWNER INFORMATION | CONTENT OWNER INFORMATION | CONTENT | DISTRIBUTION STATE |
|---|---|---|---|---|---|
| A | COMMUNITY 1 | OWNER | OWNER | PHOTO 1 | DISTRIBUTED |
| A | COMMUNITY 1 | OWNER | OWNER | PHOTO 2 | DISTRIBUTED |
| A | COMMUNITY 1 | OWNER | OWNER | VIDEO 1 | DISTRIBUTED |
| A | COMMUNITY 1 | OWNER | MEMBER | VIDEO 2 | UNDISTRIBUTED |
| B | COMMUNITY 1 | MEMBER | MEMBER | PHOTO 1 | DISTRIBUTED |
| B | COMMUNITY 1 | MEMBER | MEMBER | PHOTO 2 | UNDISTRIBUTED |
| B | COMMUNITY 1 | MEMBER | MEMBER | VIDEO 1 | UNDISTRIBUTED |
| B | COMMUNITY 1 | MEMBER | OWNER | VIDEO 2 | DISTRIBUTED |
| C | COMMUNITY 1 | MEMBER | MEMBER | PHOTO 1 | DISTRIBUTED |
| C | COMMUNITY 1 | MEMBER | MEMBER | PHOTO 2 | UNDISTRIBUTED |
| C | COMMUNITY 1 | MEMBER | MEMBER | VIDEO 1 | UNDISTRIBUTED |
| C | COMMUNITY 1 | MEMBER | MEMBER | VIDEO 2 | UNDISTRIBUTED |

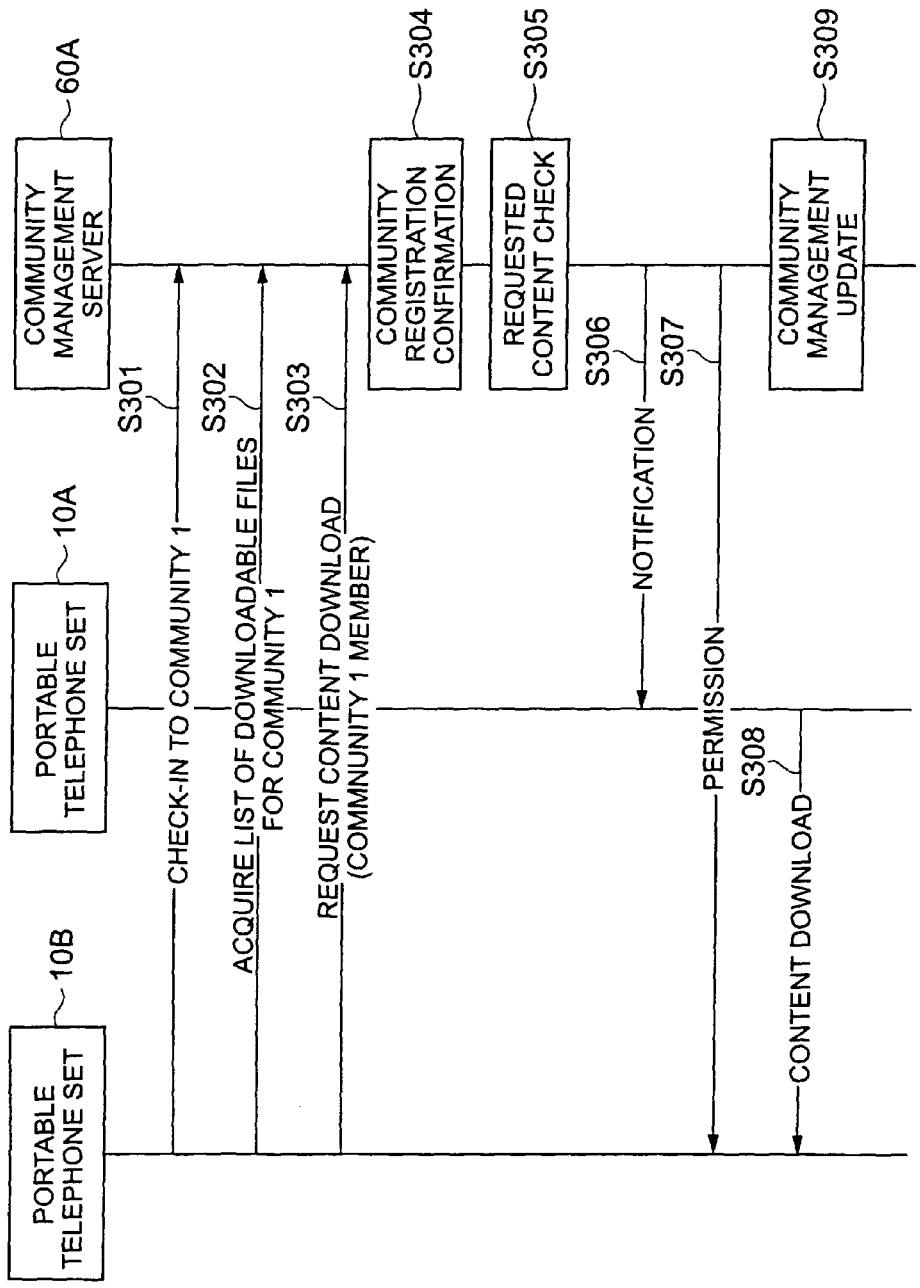

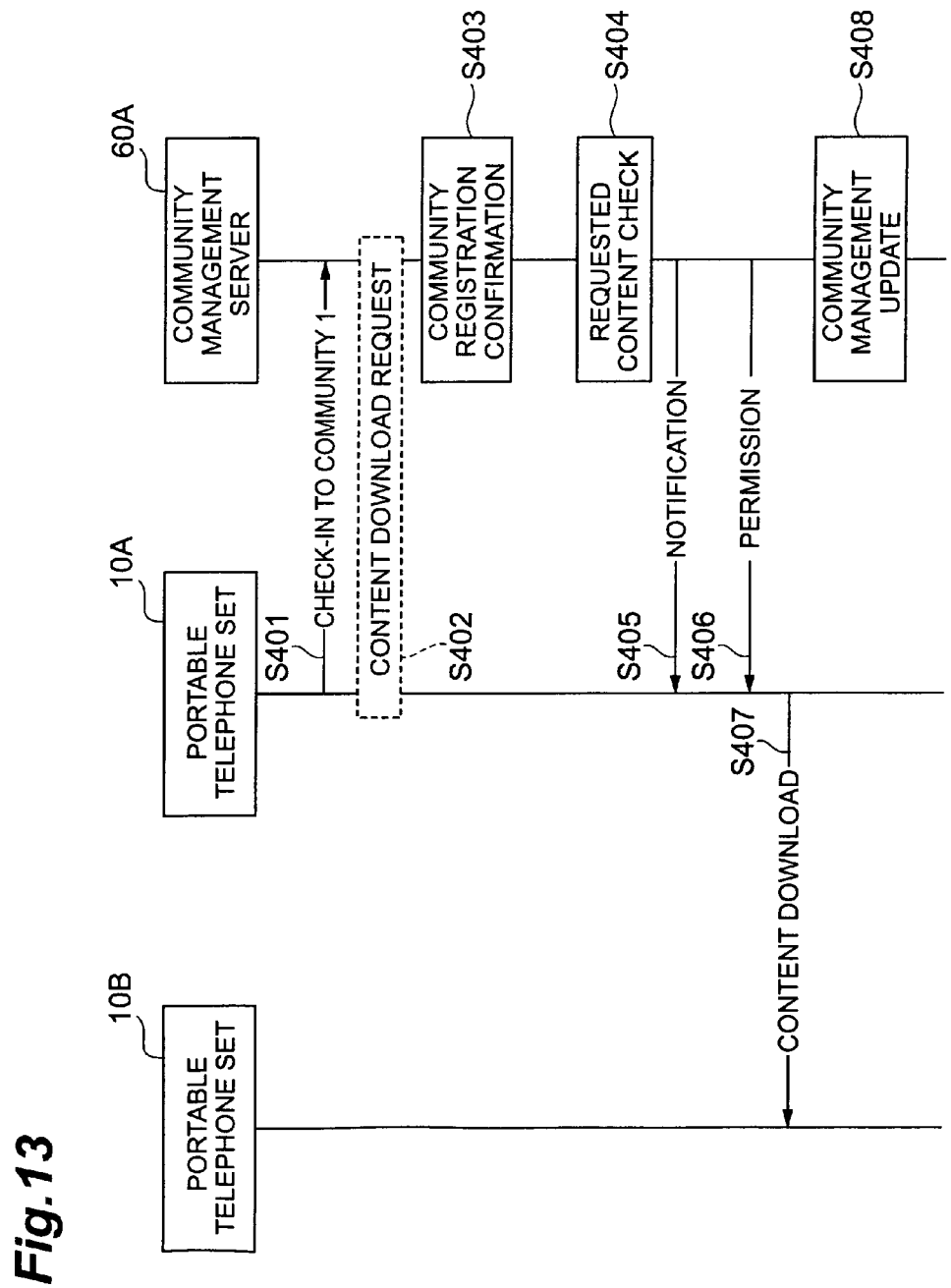

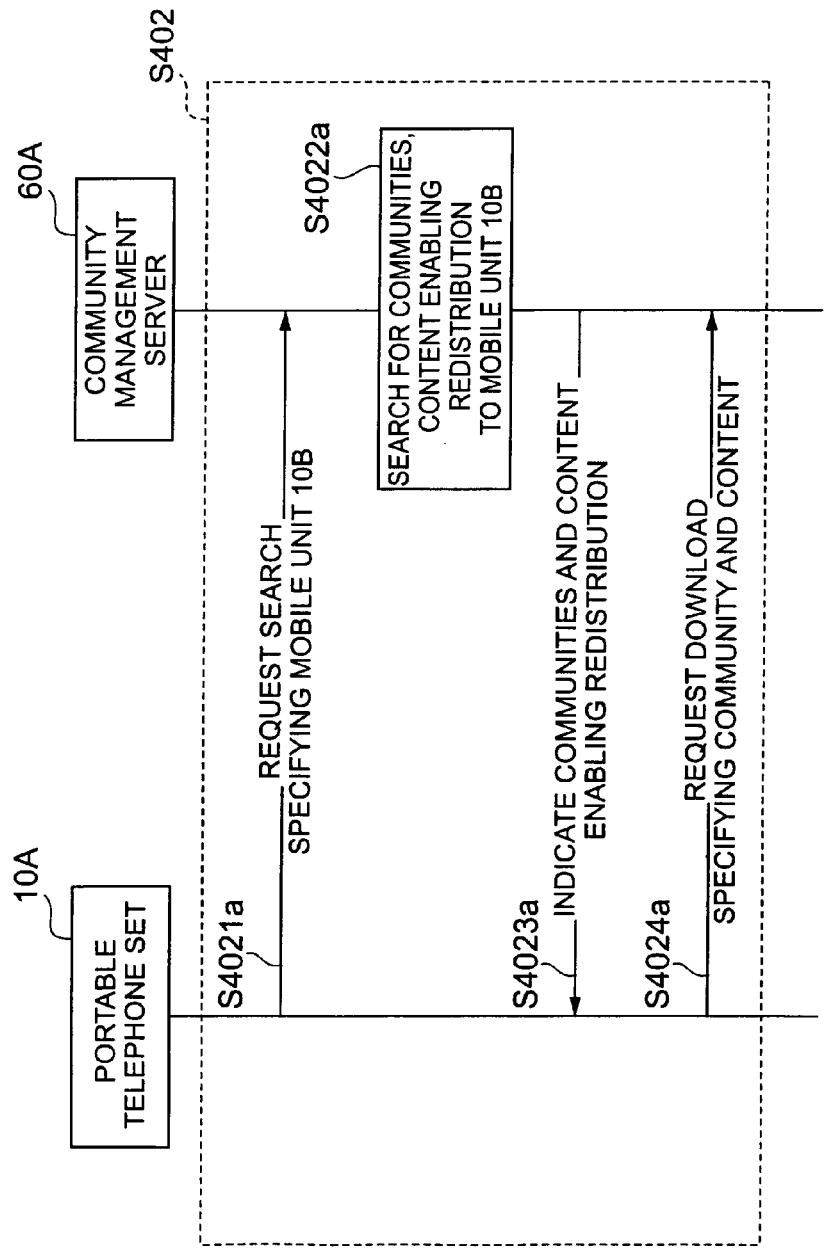

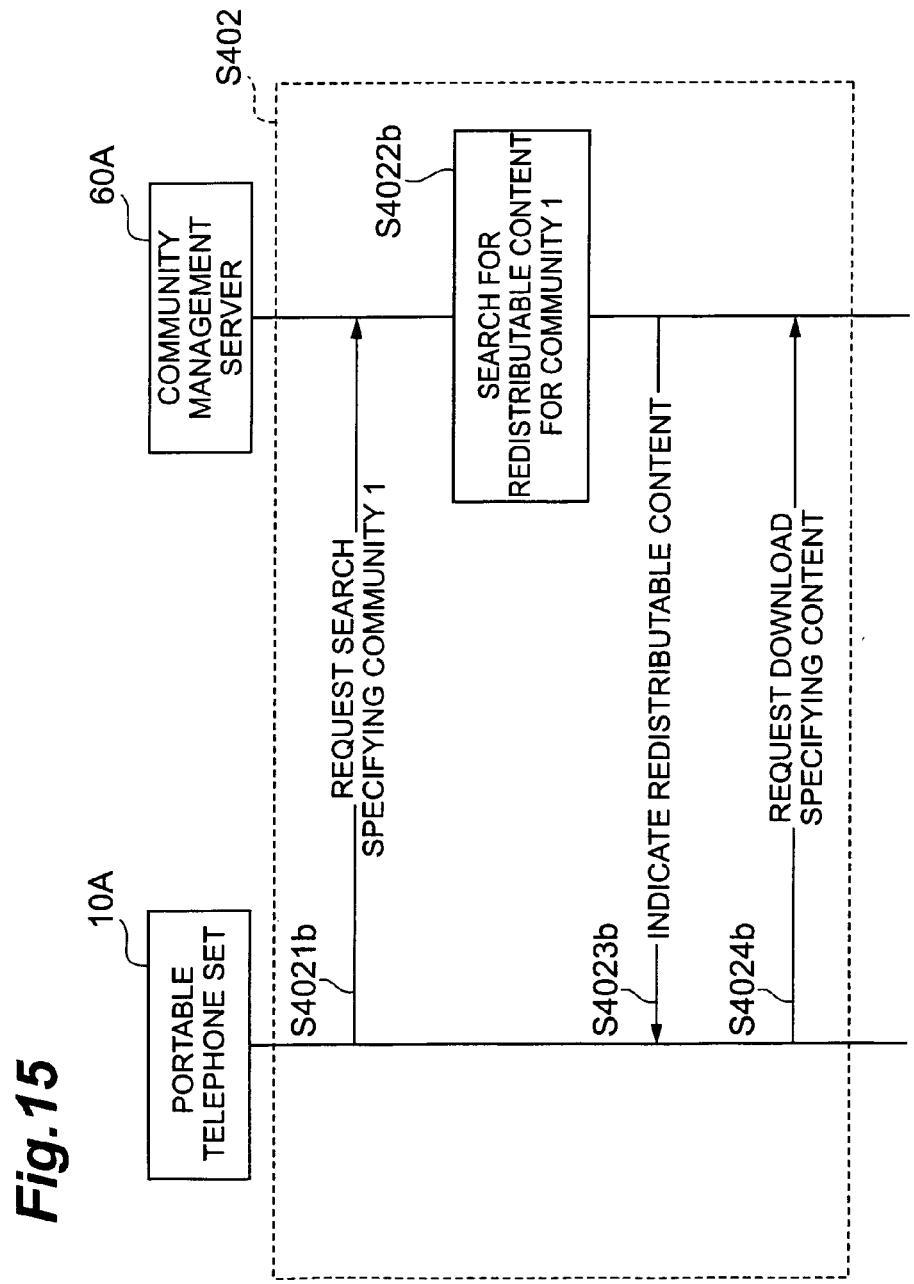

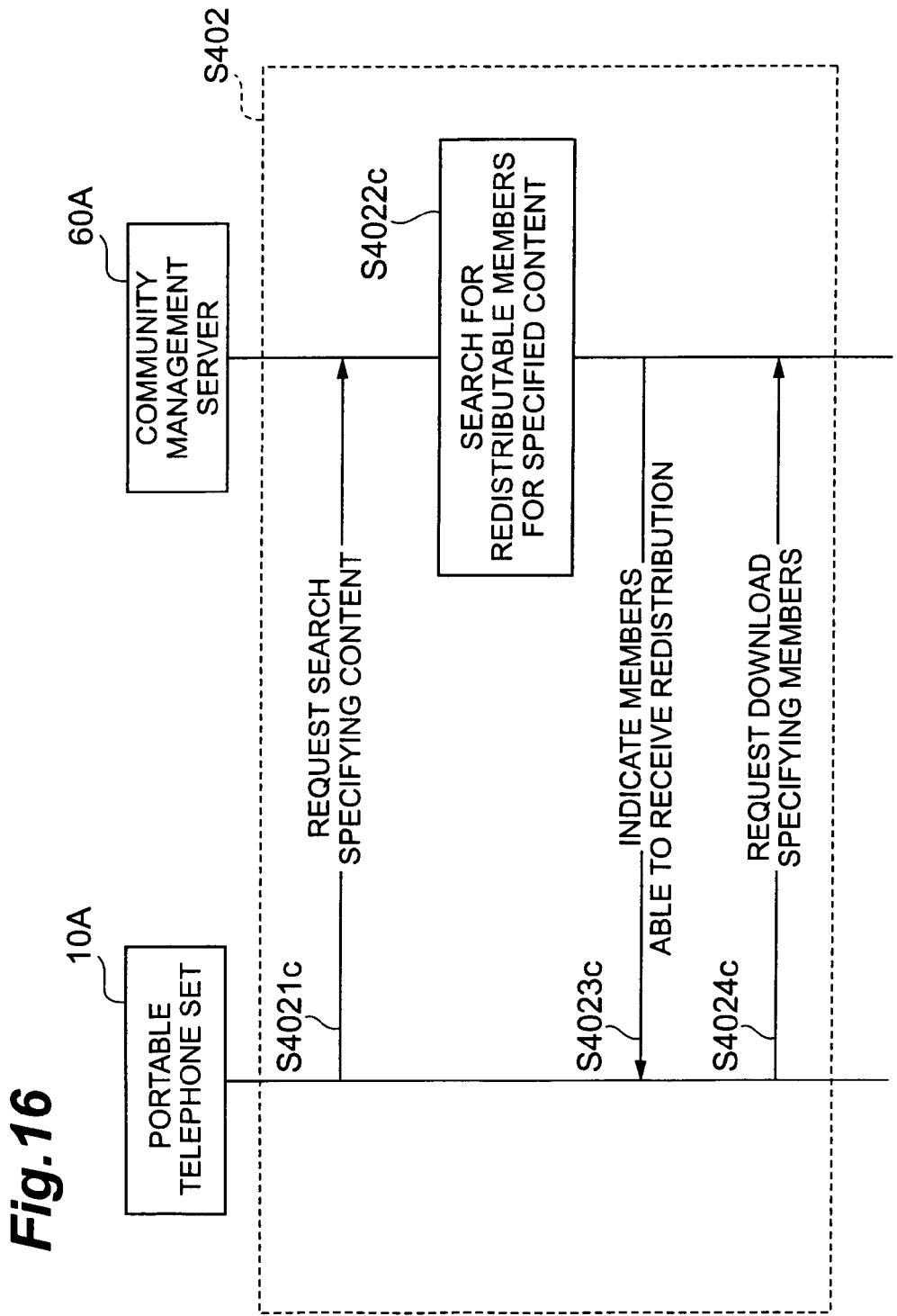

COMMUNITY MANAGEMENT SERVER, COMMUNICATION TERMINAL, CONTENT TRANSMISSION SYSTEM, AND CONTENT TRANSMISSION METHOD

BACKGROUND OF THE INVENTION

1. Field of the Invention

This invention relates to a community management server, communication terminal, content transmission system, and content transmission method, enabling direct content redistribution between communication terminals belonging to the same community.

2. Related Background Art

In recent years, ring tones and other digital content has been made available for purchase using portable telephone sets and other devices. For example, using portable telephone sets or other communication terminals capable of connection to a network, images, music, video, and other digital content can be downloaded from a server which provides content. On the other hand, in recent years, users who share common interests have formed communities (groups), so that users belonging to the same community have shared content in common.

For example, in Japanese Patent Laid-open No. 2001-283071, a content distribution system is described in which, when a certain user A downloads specific content from a content distribution service server, and wishes to present the content as a gift to user B belonging to the same community, user A, by transmitting the registration ID of user B registered in the community to the community site server, causes the community site server to appeal to the content distribution service server to enable downloading by user B also of the content from the content distribution service server, so that by this means content can be redistributed to user B belonging to the same community.

SUMMARY OF THE INVENTION

However, in a content distribution system such as described above, although content redistribution can be received from a content distribution service server which is the supply source of content by a user belonging to the same community, content redistribution cannot be performed directly between users belonging to the same community which is the purchaser. Particularly in the case of content for which copyright is established, from the standpoint of preventing illicit copying between users, redistribution of content between users is limited. For this reason, communication between users within a community has been limited. Moreover, in the above content distribution system, content must be downloaded from a content distribution service server upon each instance of content redistribution, so that the burden on the content distribution service server is considerable. For this reason, problems arise when the number of users desiring content redistribution increases.

This invention was devised in light of the above considerations, and has as an object the provision of a community management server, communication terminal, content transmission system, and content transmission method, enabling direct content redistribution between users belonging to the same community.

An invention to attain this object is characterized in comprising registration unit for registering a plurality of communication terminals belonging to the same community among a plurality of communication terminals, in association with a community; reception unit for receiving, from any communication terminal, a request for redistribution of content from one communication terminal to which content has been distributed from a transmission server to another communication terminal; confirmation unit for confirming whether a redistribution request received by the reception unit is for redistribution between communication terminals belonging to the same community registered by the registration unit; and notification unit for notifying the one communication terminal that content redistribution is to be performed from the one communication terminal to the other communication terminal when the confirmation unit has confirmed that a redistribution request is for redistribution between communication terminals belonging to the same community.

According to the above configuration, the registration unit registers a plurality of communication terminals belonging to the same community in association with the community; the reception unit receives, from any of the communication terminals, a request for redistribution of content from one communication terminal, to which content has been distributed from a transmission server, to another communication terminal; the confirmation unit confirms whether the redistribution request is for redistribution between communication terminals belonging to the same community, registered by the registration unit; and the notification unit notifies the one terminal that redistribution of content from the one communication terminal to the other communication terminal is to be performed, when the redistribution request has been confirmed as for redistribution between communication terminals belonging to the same community; hence whether the content redistribution is within the same community is confirmed between a communication terminal and a community management server alone, and so content redistribution can be performed directly between communication terminals belonging to the same community, without intervention by a transmission server.

In this case, it is preferable that the reception unit receive, from any of the communication terminals, a request for registration of the plurality of communication terminals belonging to the same community and a community, and that the registration unit, in response to the registration request received by the reception unit, registers a plurality of communication terminals belonging to the same community and the community.

According to the above configuration, the reception unit receives, from any communication terminal, a request for registration of a plurality of communication terminals belonging to the same community and a community in association, and the registration unit registers a plurality of communication terminals belonging to the same community in association with the community, so that community registration can be performed between a communication terminal and a community management server.

On the other hand, a communication terminal of this invention comprises redistribution request unit for transmitting, to the above-described community management server of the invention, requests to redistribute content from one communication terminal which has received content from a transmission server to another communication terminal.

According to this configuration, the redistribution request unit transmits, to the above-described community management server of this invention, a request for redistribution of content from one communication terminal which has received distribution of content from a transmission server to another communication terminal, so that content redistribution can be requested of a community management server, without intervention by a transmission server.

Further, a communication terminal of this invention is one communication terminal which has received content distribution from a transmission server, and comprises redistribution notification reception unit for receiving, from the above-described community management server of the invention, notification that redistribution of the content from the one communication terminal to another communication terminal is to be performed, and redistribution content transmission unit for transmitting the content to the other communication terminal, when the redistribution notification reception unit has received notification of the performance of redistribution of the content.

According to this configuration, the redistribution notification reception unit receives notification from the community management server of the performance of content redistribution from the one communication terminal to another communication terminal, and when the redistribution notification reception unit receives notification of the performance of content redistribution, the redistribution content transmission unit transmits the content to the other communication terminal, so that content can be redistributed to the other communication terminal according to the notification from the community management server, without intervention by a transmission server.

In a content transmission system of this invention, a transmission server, the community management server of this invention described above, and a plurality of communication terminals comprising the communication terminal of this invention described above, are interconnected in a communication network, and content is distributed to the communication terminals from the transmission server via the communication network.

Further, a content transmission method of this invention, in a system in which a transmission server, a plurality of communication terminals, and a community management server are interconnected in a communication network, and content is distributed from the transmission server to communication terminals via the communication network, is characterized in comprising a registration step in which the community management server registers the plurality of communication terminals belonging to the same community in association with the community; a redistribution requesting step in which any of the communication terminals transmits, to the community management server, a request for redistribution of content from one communication terminal, which has received content distribution from the transmission server, to another communication terminal; a confirmation step in which the community management server confirms whether the redistribution request transmitted in the redistribution requesting step is for redistribution between communication terminals belonging to the same community registered in the registration step; and a notification step in which, when the redistribution request is confirmed to be redistribution between communication terminals belonging to the same community in the confirmation step, the community management server notifies the one terminal of the performance of content redistribution from the one communication terminal to the other communication terminal.

By means of a community management server, communication terminal, content transmission system, and content transmission method of this invention, direct redistribution of content between users belonging to the same community becomes possible.

BRIEF DESCRIPTION OF THE DRAWINGS

FIG. 8 shows the configuration of the community information database comprised by the community management server of the present embodiment;

FIG. 12 is a sequence diagram showing operation when a content-member portable telephone set requests permission for content redistribution, and content redistribution is received from the content-member portable telephone set;

FIG. 13 is a sequence diagram showing operation when a content-owner portable telephone set requests permission for content redistribution, and content redistribution is performed to a content-member portable telephone set;

FIG. 14 is a flow diagram showing a more detailed example of operation in FIG. 13;

FIG. 15 is a flow diagram showing a more detailed example of operation in FIG. 13; and FIG. 16 is a flow diagram showing a more detailed example of operation in FIG. 13.

DESCRIPTION OF THE PREFERRED EMBODIMENTS

Figure 1:
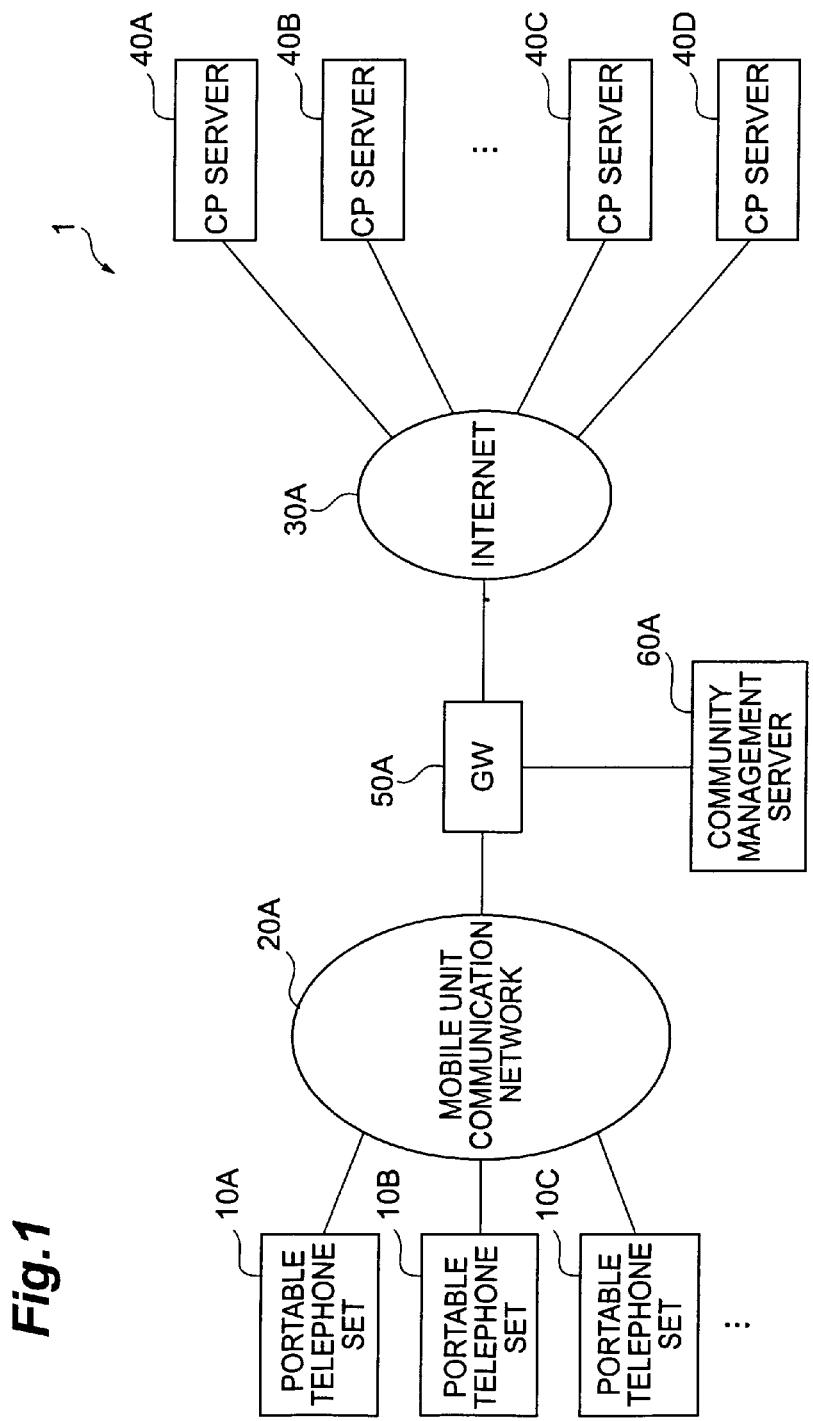
FIG. 1 shows in summary the configuration of the content transmission system of present embodiment.

Next, an embodiment of the invention will be explained, referring to the drawings. The present embodiment describes a mode of the invention, but does not limit the invention. Moreover, the invention can be variously modified within the scope of the technical concept of the invention.

FIG. 1 shows in summary the configuration of a content transmission system of the present embodiment. The content transmission system 1 of the present embodiment comprises a plurality of portable telephone sets (communication terminals) 10A, 10B, 10C; a mobile unit communication network 20A to which the portable telephone sets 10A to 10C belong; the Internet 30A; a plurality of CP (Content Provider) servers (transmission servers) 40A, 40B, 40C, 40D, connected to the Internet 30A; a GW (Gateway) 50A, connecting the mobile unit communication network 20A and the Internet 30A; and a community management server 60A connected to the GW 50A. The content transmission system 1 is a system in which content is distributed from the CP servers 40A to 40D, which provide content, to the portable telephone sets 10A to 10C, and in which content which has once been distributed is directly redistributed between the portable telephone sets 10A to 10C, which form a single community, under the management of the community management server 60A. The content transmission system 1 handles copyrighted content for which copyright has been established. In order to protect the copyright of copyrighted content, settings are issued so as to prevent redistribution, content duplication, attachment in mail, and similar between portable telephone sets to which permission has not been granted.

The CP servers 40A to 40D are servers which distribute images, music, video, and other digital content to the portable telephone sets 10A to 10C, which are owned by general users who use the Internet.

For example, the CP servers 40A to 40D store content in HTML (Hypertext markup language) format files, and provide content to users. Further, the CP servers 40A to 40D provide content protected by copyright, by performing individual authentication before providing image information, music information, video information, or other copyrighted content which is under copyright.

The portable telephone sets 10A to 10C and the CP servers 40A to 40D are configured so as to enable connection via the mobile unit communication network 20A, GW 50A, and the Internet 30A. The mobile unit communication network 20A comprises a plurality of wireless base stations, a plurality of packet subscriber processing devices, and a communication circuit connecting these devices. The portable telephone sets 10A to 10C use the mobile unit communication network 20A to receive packet communication services, and are provided with WWW (World Wide Web) browser and electronic mail functions.

Figure 2:
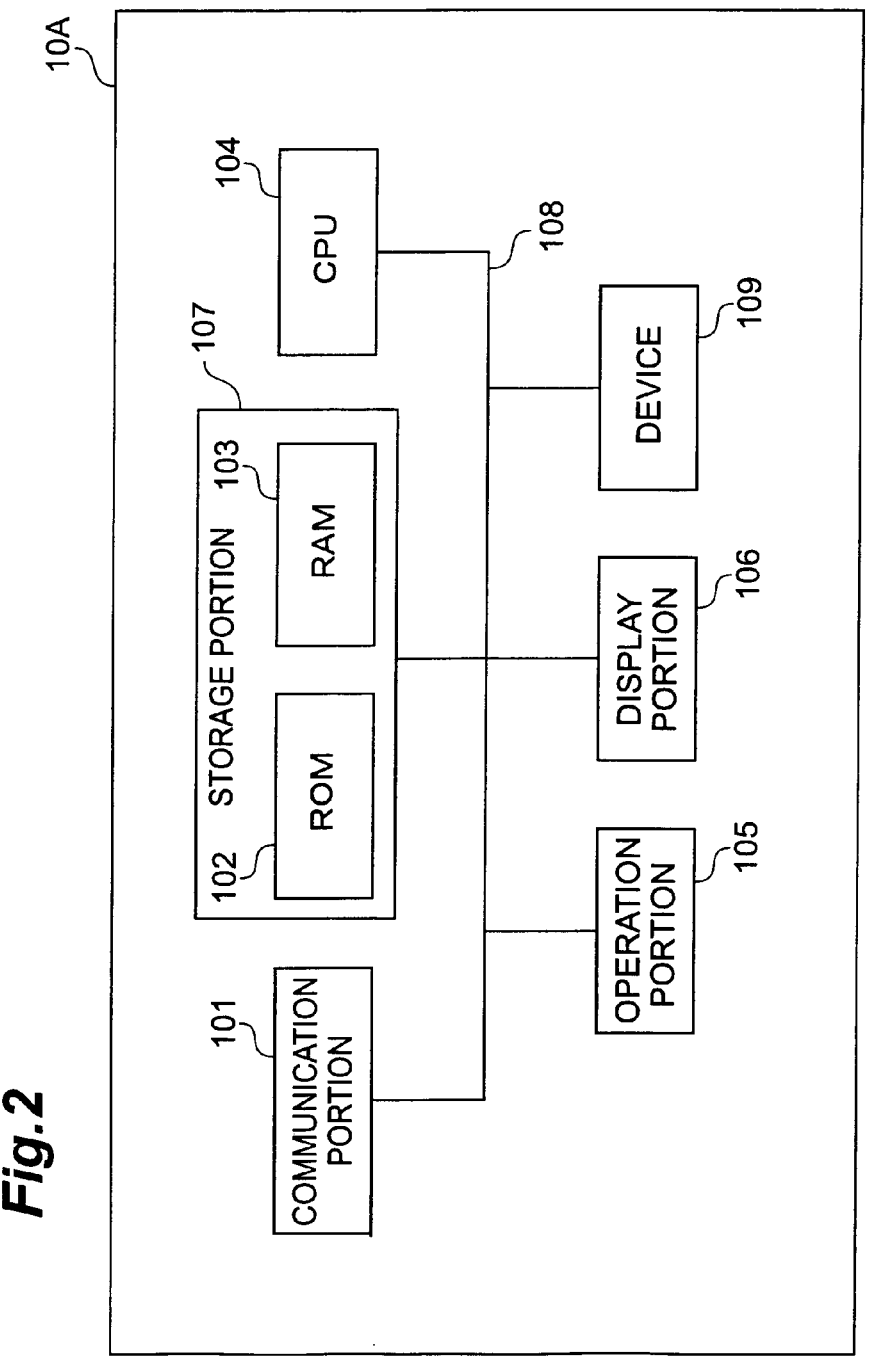
FIG. 2 shows in summary the configuration of the portable telephone set of the present embodiment.
Figure 3:
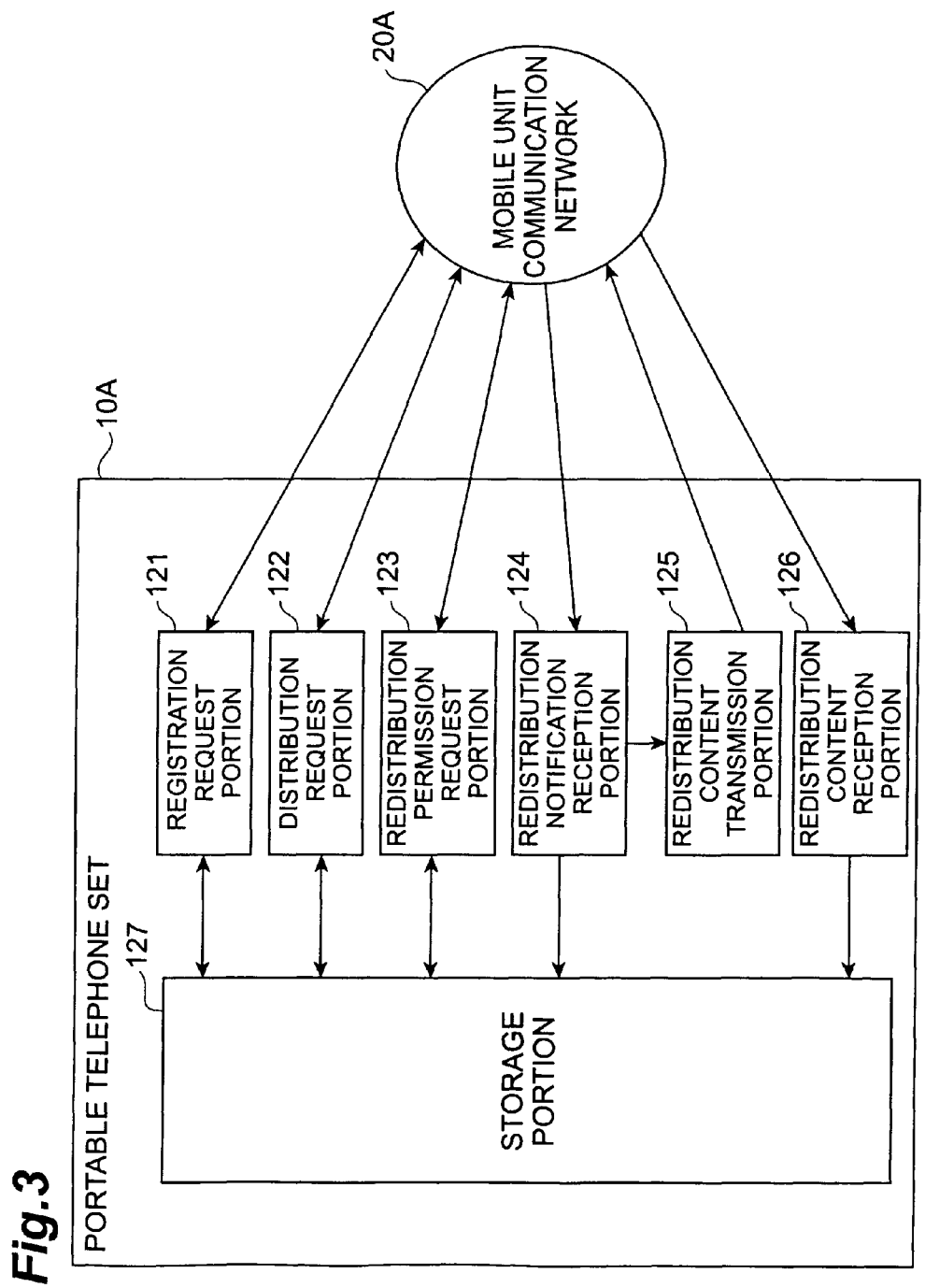
FIG. 3 shows the functional configuration of the portable telephone set of the present embodiment.

Next, the portable telephone sets 10A to 10C are explained in detail referring to FIG. 2 and FIG. 3. FIG. 2 shows in summary the configuration of a portable telephone set of the present embodiment. FIG. 3 shows the functional configuration of a portable telephone set of the present embodiment. The portable telephone sets 10A to 10C have the same physical and functional configurations, and so portable telephone set 10A is explained, and explanations of the configurations of portable telephone sets 10B and 10C are omitted.

As shown in FIG. 2, the portable telephone set 10A has, as constituent elements, a communication portion 101, CPU 104, operation portion 105, display portion 106, storage portion 107, and device 109. These constituent elements are interconnected by a bus 108.

The communication portion 101 performs wireless data communication with a base station comprised by the mobile unit communication network 20A. The communication portion 101 transmits, for example, WWW browser transmission data and electronic mail software transmission data to the base station through control by the CPU 104. The CPU 104 controls the different constituent elements connected via the bus 108 by executing various programs stored in the storage portion 107.

The storage portion 107 comprises ROM (Read Only Memory) 102 and RAM (Random Access Memory) 103. In the ROM 102 are stored various programs executed by the CPU 104, control data, and similar. The various programs may for example be the operating system of the portable telephone set 10A and the above-described WWW browser and electronic mail software. The RAM 103 is used as a work area of the CPU 104. For example, electronic mail data received by the electronic mail software, image data and copyrighted image data downloaded using the WWW browser, and other data relating to content may be stored in the RAM 103 of the portable telephone set 10A.

The operation portion 105 comprises a plurality of keys for use in inputting characters, numerals, operation instructions, and similar. The operation portion 105 outputs operation signals to the CPU 104 according to key operations. The display portion 106 comprises a liquid crystal display panel which is a display screen, and a driver circuit which drives the liquid crystal display panel. The device 109 specifically comprises a speaker, vibrator, camera, or other equipment, as well as driving circuitry for same, and operates upon receiving instruction signals from the CPU 104 via the bus 108.

As shown in FIG. 3, the portable telephone set 10A comprises, as functional constituent elements, a registration request portion 121, distribution request portion 122, redistribution permission request portion (redistribution request means) 123, redistribution notification reception portion (redistribution notification reception means) 124, redistribution content transmission portion (redistribution content transmission means) 125, redistribution content reception portion 126, and storage portion 127.

The registration request portion 121 sends requests to the community management server 60A for registration of portable telephone sets 10A to 10C belonging to the same community in association with the relevant community. That is, the registration request portion 121 transmits community registration requests to the community management server 60A from the mobile unit communication network 20A via the GW 50A. A community registration request comprises the IDs of the portable telephone sets 10A to 10C for use in performing individual authentication of the user of the portable telephone set 10A. The registration request portion 121 transmits a community registration request, and after receiving authentication from the community management server 60A, transmits to the community management server 60A request information required for community registration. Request information comprises the name of the relevant community, and the IDs of the initial participating members of the community. The above IDs are information specifying the portable telephone sets 10A to 10C, or specifying the users of the portable telephone sets 10A to 10C; telephone numbers or similar are used. Upon community registration, the registration request portion 121 references content stored in the storage portion 127 as appropriate.

The distribution request portion 122 issues requests for content distribution to the CP servers 40A to 40D. The distribution request portion 122 uses a website or similar provided by the CP servers 40A to 40D to request information to search for content to download. The distribution request portion 122 also transmits information to the CP servers 40A to 40D specifying the download method. And, the distribution request portion 122 transmits content download requests to the CP servers 40A to 40D, requesting content distribution, and receives the relevant content from the CP servers 40A to 40D. The received content is stored in the storage portion 127. A content download request comprises information specifying the content for which distribution is requested, an ID for use in authentication, and information specifying the range of the download. Upon requesting content distribution, the distribution request portion 122 references content stored in the storage portion 127 as appropriate, in order that there is no redundant downloading of content.

The redistribution permission request portion 123 issues a request to the community management server 60A for permission to redistribute content, distributed from a CP server 40A to 40D, between portable telephone sets 10A to 10C belonging to the same community. The redistribution permission request portion 123 transmits to the community management server 60A, from the mobile unit communication network 20A via the GW 50A, information to specify the relevant community, a request indicating a desire to acquire a list of content which can be redistributed within the relevant community, and information to specify the content for which redistribution permission is sought. The redistribution permission request portion 123 references the content stored in the storage portion 127 as appropriate, in order to confirm whether redistribution is possible, and in order that there is no redundant content redistribution.

The redistribution notification reception portion 124 receives, from the community management server 60A, notification of the fact of redistribution to the other portable telephone sets 10B, 10C of content distributed to the portable telephone set 10A from a CP server 40A to 40D. The redistribution notification reception portion 124 transmits the relevant redistribution notification to the redistribution content transmission portion 125.

The redistribution content transmission portion 125 transmits, to other portable telephone sets 10B, 10C belonging to the same community, content stored in the storage portion 127, which is content for which notification of redistribution has been received from the community management server 60A and redistribution of which has been approved. This transmission is performed automatically, without requiring any particular operation by the user of the portable telephone set 10A.

The redistribution content reception portion 126 receives, from other relevant portable telephone sets 10B and 10C, content stored in the storage portions 127 of the other portable telephone sets 10B and 10C belonging to the same community, redistribution of which has been approved by the community management server 60A. Content received from the other portable telephone sets 10B, 10C is stored in the storage portion 127.

Figure 4:
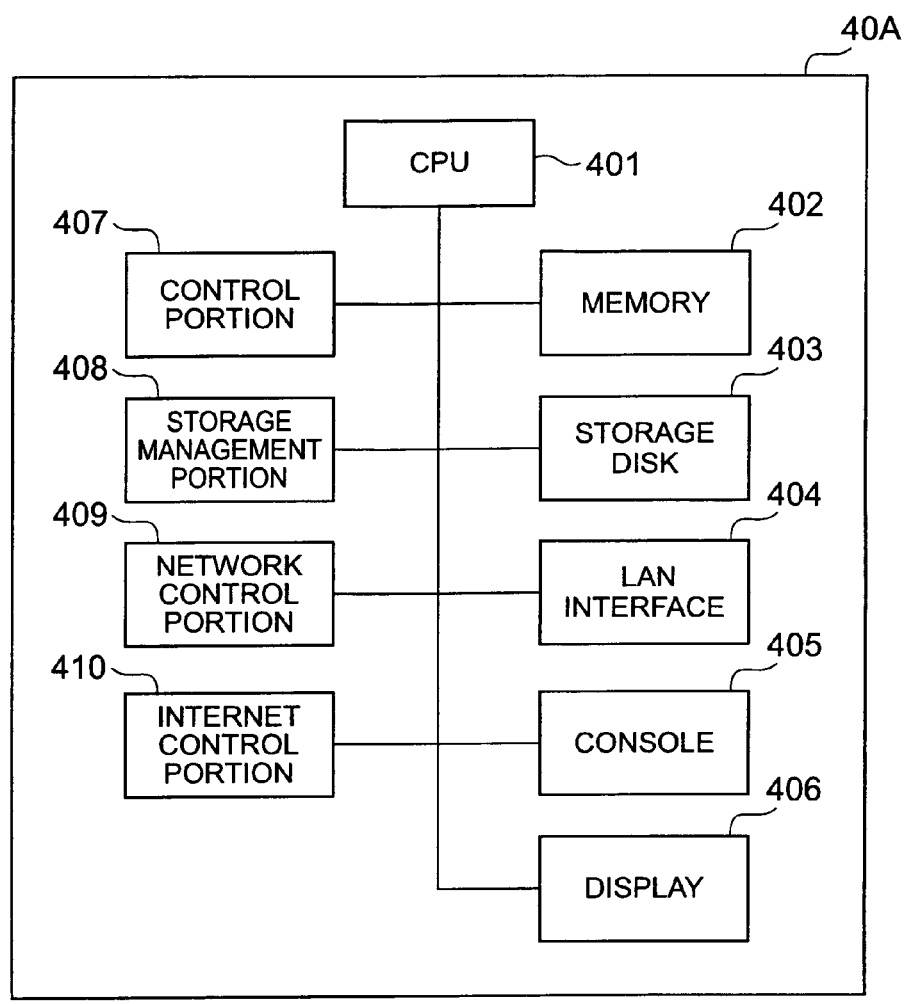
FIG. 4 shows in summary the configuration of the CP server of the present embodiment.
Figure 5:
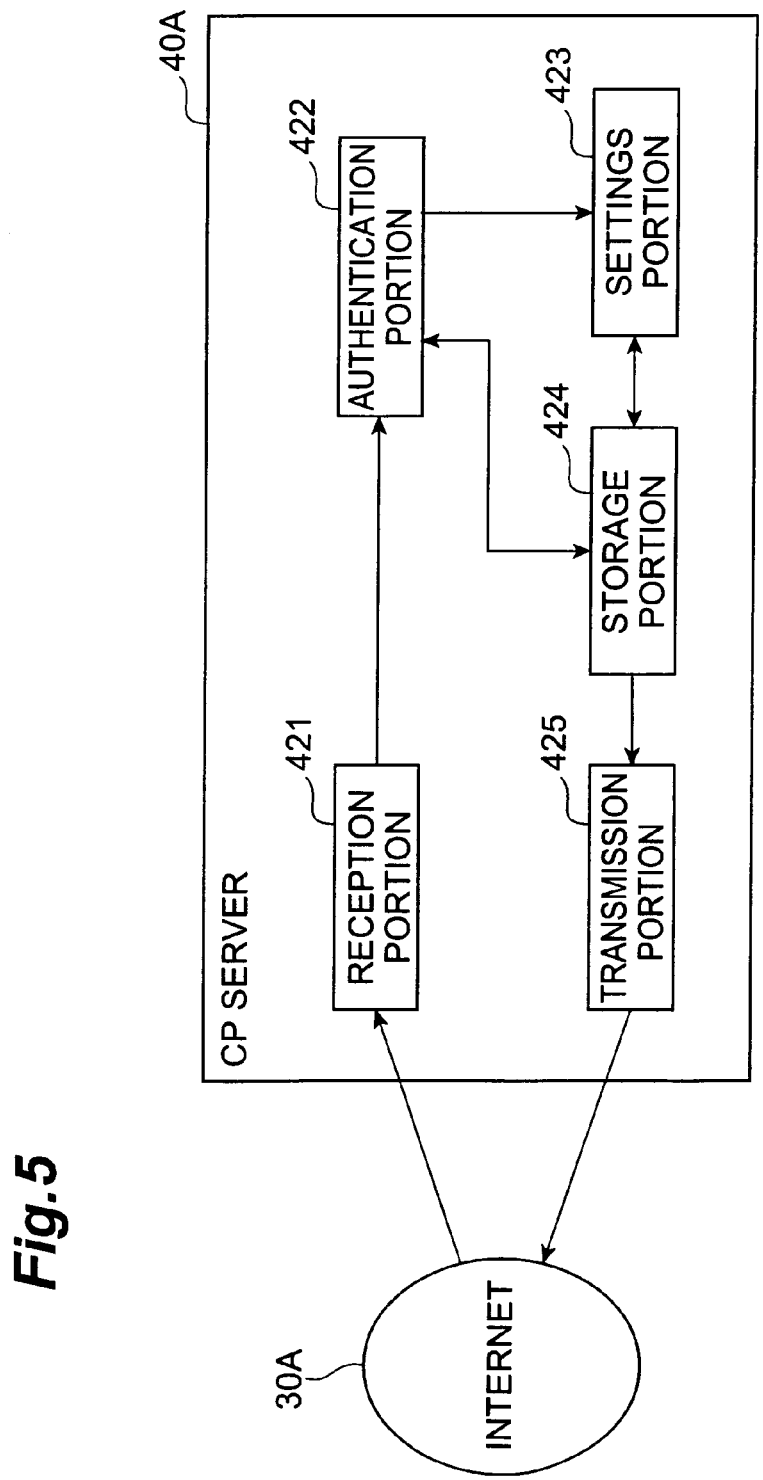
FIG. 5 shows the functional configuration of the CP server of the present embodiment.

Next, the CP servers 40A to 40D are explained referring to FIG. 4 and FIG. 5. FIG. 4 shows in summary the configuration of a CP server of the present embodiment. FIG. 5 shows the functional configuration of a CP server of the present embodiment. The CP servers 40A to 40D have the same physical and functional configuration, and so the case of CP server 40A is explained, and explanations of CP servers 40B to 40D are omitted.

As shown in FIG. 4, the CP server 40A has, as constituent elements, a CPU 401, memory 402, storage disk 403, LAN interface 404, console 405, display 406, control portion 407, storage management portion 408, network control portion 409, and Internet control portion 410. The CP server 40A operates by means of the control portion 407, network control portion 409, and Internet control portion 410, which run on the CPU 401.

Content download requests transmitted from the portable telephone sets 10A to 10C are sent to the CP server 40A via the LAN interface 404. Content download requests sent in this way are processed by the Internet control portion 410, and are then judged to be content distribution requests by the control portion 407. The control portion 407 retrieves the content requested by a content download request from the storage disk 403, via the storage management portion 408. The retrieved content is passed to the network control portion 409 by the control portion 407. The network control portion 409 transmits the content thus passed to the portable telephone set 10A which had issued the content distribution request, via the LAN interface 404. Content registration, modification, deletion, and management data editing are performed using the console 405 and display 406.

Next, the functional constituent elements of the CP server 40A are explained in detail, referring to FIG. 5. The CP server 40A comprises, as functional constituent elements, a reception portion 421, authentication portion 422, settings portion 423, storage portion 424, and transmission portion (content transmission means) 425.

The reception portion 421 receives content distribution requests from the portable telephone sets 10A to 10C. That is, the reception portion 421 receives content download requests, comprising information specifying content, and requesting distribution of content. The reception portion 421 outputs received content download requests to the authentication portion 422.

The authentication portion 422 uses the ID comprised by the content download request output from the reception portion 421 to perform authentication of the user, referencing information relating to content purchases by ID stored in the storage portion 424. After performing authentication, the authentication portion 422 outputs the content download request to the settings portion 423.

The settings portion 423 resets information relating to content purchases by ID stored in the storage portion 424, according to the content and IDs indicated by the output content download request.

The storage portion 424 stores a plurality of types of content to be distributed to portable telephone sets 10A to 10C, and content purchase history is stored by ID, and is updated by the settings portion 423 as appropriate.

The transmission portion 425 retrieves content corresponding to a content download request from the storage portion 424, and distributes the content to the portable telephone set 10A to 10C which had transmitted the content download request, via the Internet 30A, GW 50A, and mobile unit communication network 20A.

Figure 6:
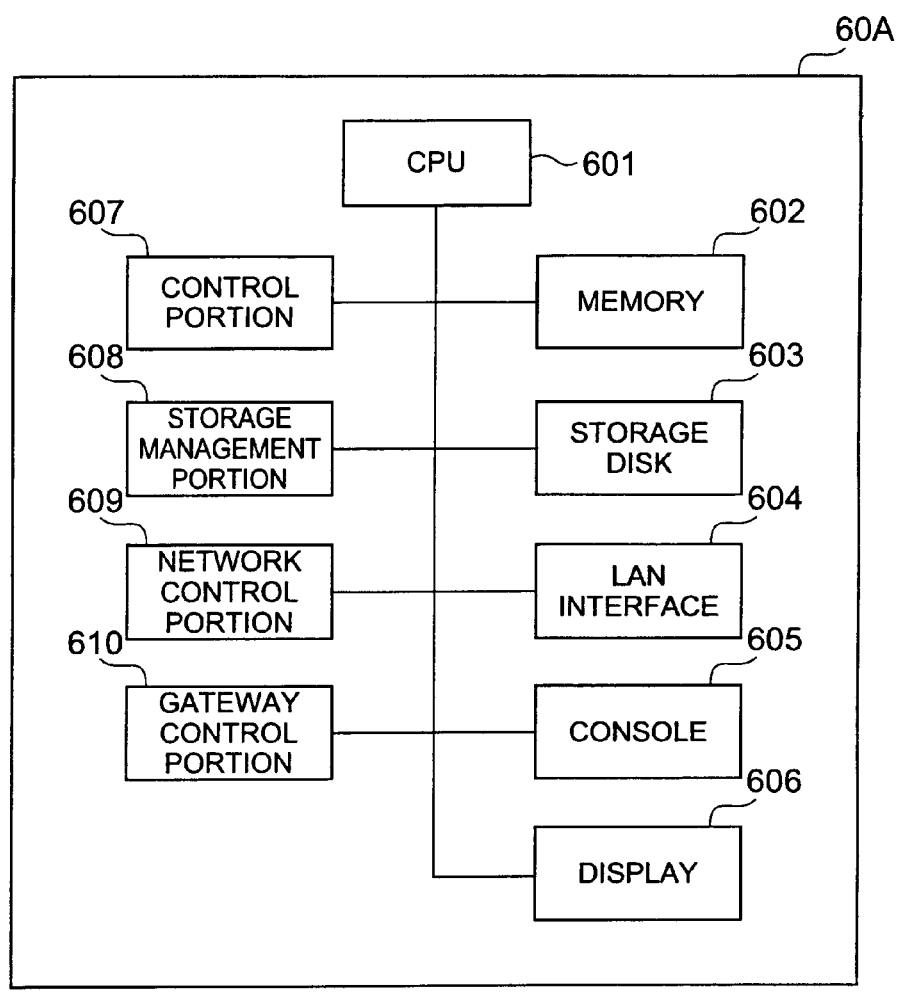
FIG. 6 shows in summary the configuration of the community management server of the present embodiment.
Figure 7:
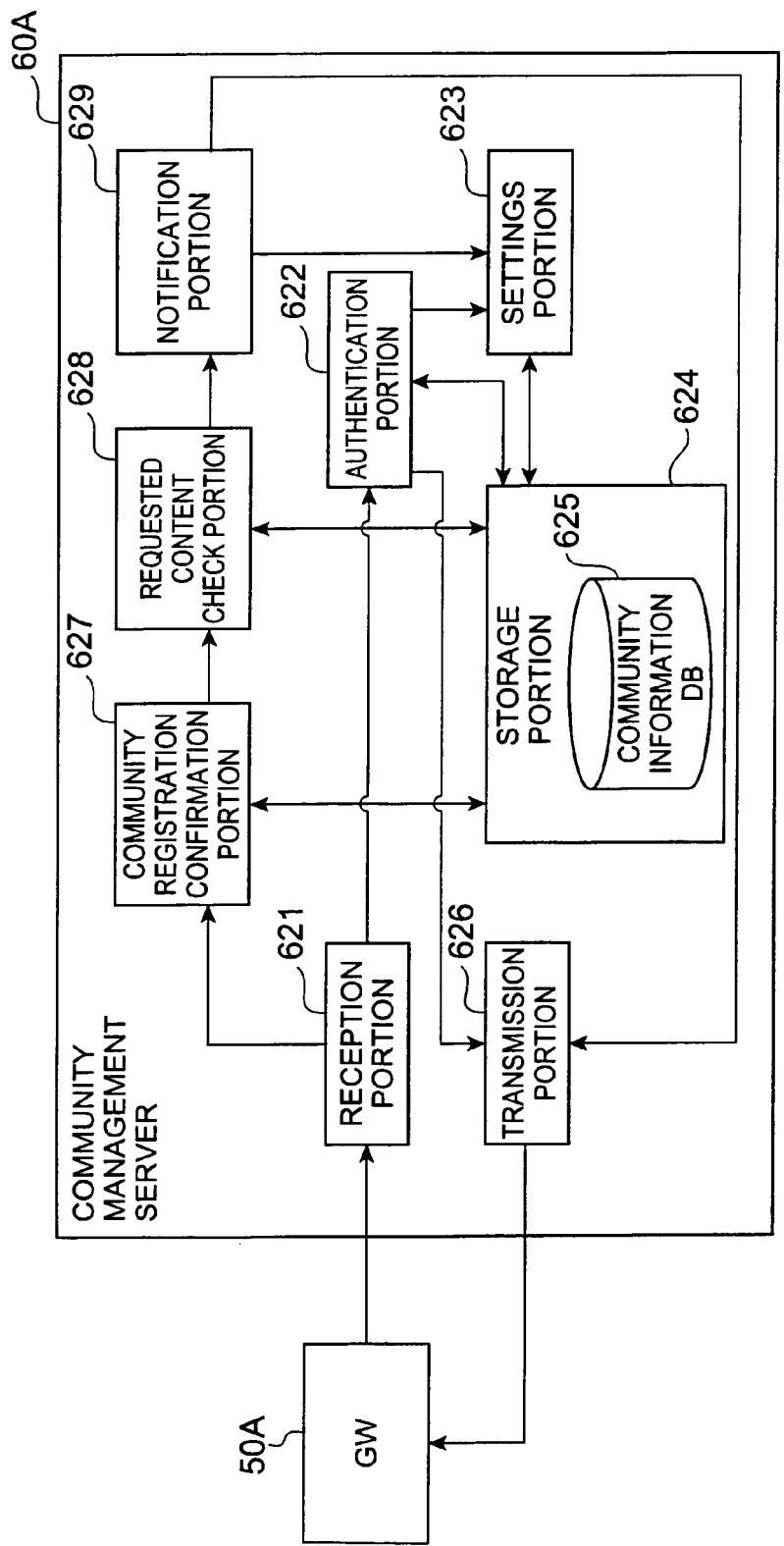
FIG. 7 shows the functional configuration of the community management server of the present embodiment.

Next, the community management server 60A is explained referring to FIG. 6 and FIG. 7. FIG. 6 shows in summary the configuration of the community management server of the present embodiment. FIG. 7 shows the functional configuration of the community management server of the present embodiment. As shown in FIG. 6, the community management server 60A has, as constituent elements, a CPU 601; memory 602; storage disk 603; LAN interface 604; console 605; display 606; control portion 607; storage management portion 608; network control portion 609; and gateway control portion 610. The community management server 60A operates by means of a control portion 607, network control portion 609, and gateway control portion 610, running on the CPU 601.

Community registration requests, content download requests and similar transmitted from the portable telephone sets 10A to 10C are sent via the LAN interface 604. The community registration requests and content download requests sent in this way are processed by the gateway control portion 610, and then are each judged to be community registration requests or similar in the control portion 607.

The control portion 607 writes information comprised by community registration requests and content download requests to the storage disk 603 via the storage management portion 608. The control portion 607 retrieves community information corresponding to the content requested by the content download request from the storage disk 603, via the storage management portion 608, and judges whether to grant approval of the relevant content download request. Information relating to community registration completion notification, or information relating to approval of content downloading, is passed by the control portion 607 to the gateway control portion 609. The gateway control portion 609 transmits the information relating to community registration completion notification, or the information relating to content download approval, which has been passed, to the portable telephone set 10A which has issued the community registration request or the content download request, via the LAN interface 604. Community registration, modification, deletion, and management data editing are performed using the console 605 and display 606.

Next, functional constituent elements of the community management server 60A are explained in detail, referring to FIG. 7. The community management server 60A comprises, as functional constituent elements, a reception portion (reception means) 621, authentication portion 622, settings portion 623, storage portion 624, transmission portion 626, community registration confirmation portion (confirmation means) 627, and requested content check portion 628, notification portion (notification means) 629. A community information DB (registration means) 625 is stored in the storage portion 624.

The reception portion 621 receives a community registration request, comprising the user ID of the relevant portable telephone set 10A, upon the occasion of a community registration request. In this case, the reception portion 621 outputs the received information to the authentication portion 622. After receiving the community registration request, the reception portion 621 receives request information necessary for community registration, such as the community name and the IDs of community members.

Further, on the occasion of a content download request, the reception portion 621 receives the ID for which to perform authentication, information to specify the content distribution of which is requested, and a range over which to perform downloading. In this case, the reception portion 621 outputs the ID for authentication to the authentication portion 622. And, on the occasion of a content download request, the reception portion 621 outputs information specifying the content and information specifying the range over which downloading is performed to the community registration confirmation portion 627.

The authentication portion 622 uses the ID comprised by the community registration request or content download request output from the reception portion 621 to perform authentication as to whether the portable telephone set or user which has transmitted the community registration request or similar is a proper telephone set or user, by searching for and referencing information relating to IDs and communities for each content, stored in the community information DB 625 of the storage portion 624. The authentication portion 622 outputs the authentication result to the transmission portion 626. After performing authentication, the authentication portion 622 outputs the community registration request or content download request to the settings portion 623.

The settings portion 623 updates information stored in the community information DB 625 of the storage portion 624, according to the output community registration request or content download request.

In the community information DB 625 of the storage portion 624 are registered portable telephone sets 10A to 10C belonging to the same community, in association with the relevant community and content. FIG. 8 shows the configuration of the community information database comprised by the community management server of the present embodiment. As shown in FIG. 8, in the community information DB 625, information is registered for each portable telephone set indicating community membership. In the present embodiment, one portable telephone set can simultaneously belong to a plurality of communities with different members. The community information DB 625 registers, for each portable telephone set, information indicating whether the relevant portable telephone set is an owner in charge of the community or is a member which has joined the community, and information indicating whether the relevant portable telephone set is an owner which has received direct distribution from a CP server 40A to 40D of content, or is a member which has received redistribution from another portable telephone set.

Further, information relating to content type and the state of distribution of the content is registered, for each portable telephone set, in the community information DB 625. The stored information is updated as appropriate by the settings portion 623.

Returning to FIG. 7, the community registration confirmation portion 627 receives from the reception portion 621 information to specify content comprised by the content download request and information specifying the range of downloading, and while referencing the community information DB 625 of the storage portion 624, confirms whether the relevant content download request is for redistribution between communication terminals belonging to the same community. The community registration confirmation portion 627 outputs the confirmation result to the notification portion 629 via the requested content check portion 628.

The requested content check portion 628 receives information to specify the content comprised by the content download request and information specifying the range of downloading from the community registration confirmation portion 627, and checks whether the relevant content may be redistributed to the specified community. The requested content check portion 628 outputs the check result to the notification portion 629.

When the notification portion 629 receives from the community registration confirmation portion 627 a confirmation result indicating that the relevant content download request is for redistribution between communication terminals belonging to the same community, and moreover receives from the requested content check portion 628 a check result indicating that the relevant content may be redistributed to the specified community, the notification portion 629 generates a notification for, for example, the portable telephone set 10A, indicating that the content distributed from a CP server 40A to 40D to the portable telephone set 10A is to be redistributed to the other portable telephone sets 10B, 10C. The notification portion 629 outputs the generated notification to the transmission portion 626.

As a response, the transmission portion 626 transmits the authentication result from the authentication portion 622 and the notification from the notification portion 629 to the portable telephone set 10A to 10C which had transmitted the community registration request or content download request, via the GW 50A and mobile unit communication network 20A.

Figure 9:
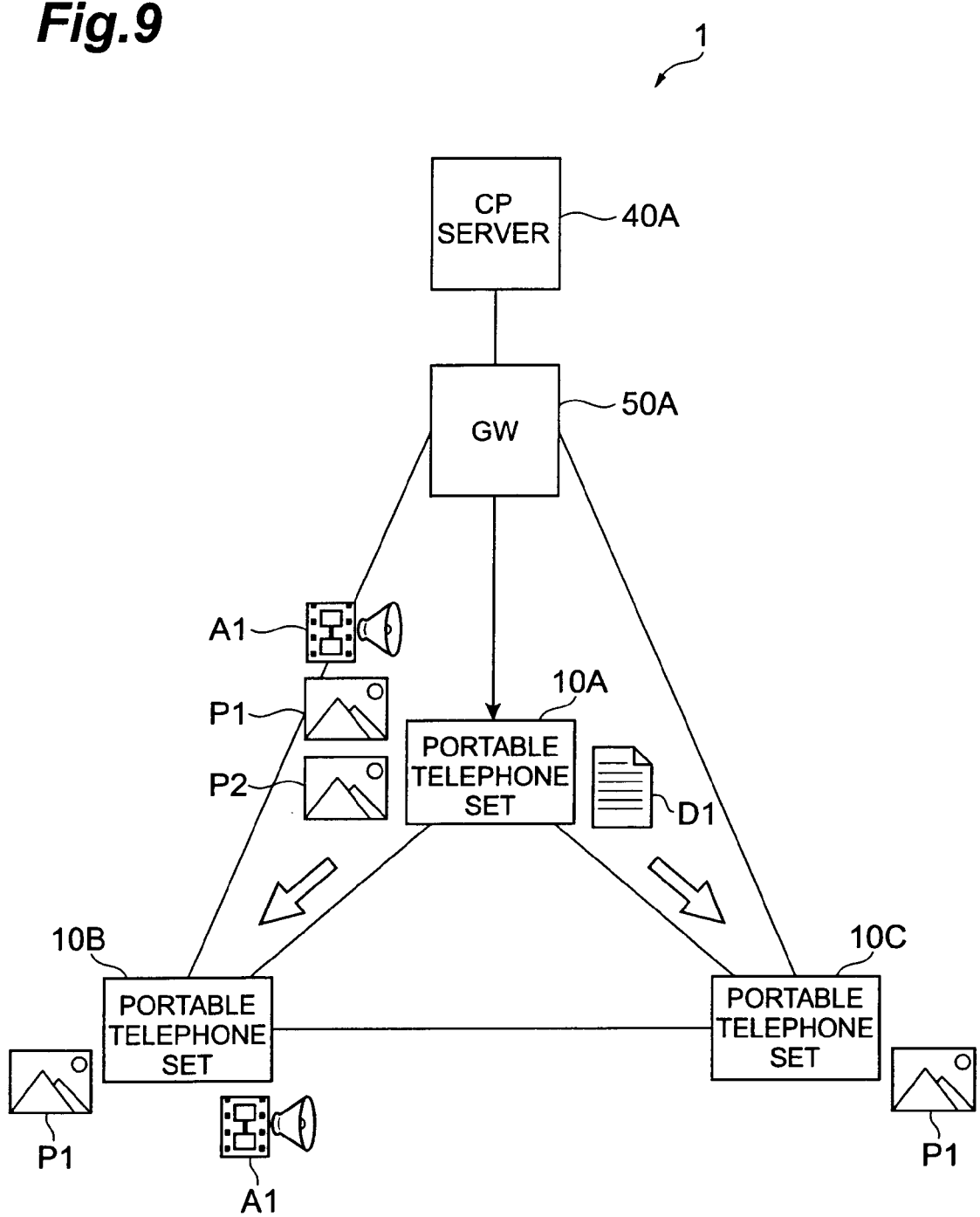
FIG. 9 shows in summary content redistribution in the present embodiment.

Next, operation of the content transmission system 1 is explained, and the content transmission method is described. In the following example, as shown summarily in FIG. 9, if the portable telephone sets 10A to 10C belong to community 1, the CP server 40A approves direct redistribution of content between the portable telephone sets 10A to 10C, and so allows content to be downloaded once from the CP server 40A to the portable telephone set 10A. Audio content A1, image content P1 and P2, document content D1, and other content downloaded from the CP server 40A to the portable telephone set 10A is managed on the side of the GW 50 for the community 1. On the GW 50 side, when redistribution to the portable telephone sets 10B, 10C belonging to community 1 has been confirmed, the redistribution is permitted without requiring accessing of the CP server 40A, and content is redistributed directly between the portable telephone sets 10A to 10C.

(Community Information Registration)

Figure 10:
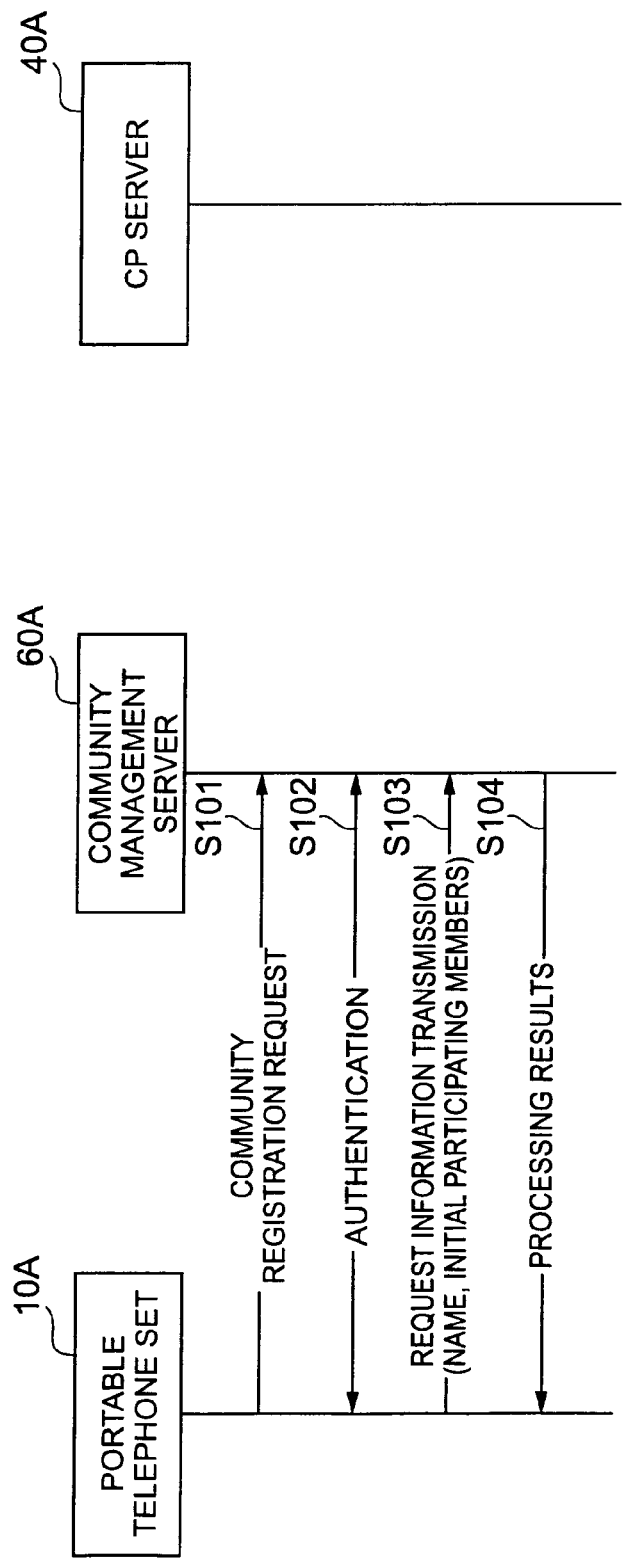
FIG. 10 is a sequence diagram showing operation when a portable telephone set performs community registration on the gateway side.

FIG. 10 is a sequence diagram showing operation when a portable telephone set performs community registration on the gateway side. As shown in FIG. 10, the registration request portion 121 of the portable telephone set 10A transmits a community registration request, comprising its own ID, to the community management server 60A on the side of the GW 50A (S101). When the reception portion 621 receives the community registration request, the community management server 60A performs authentication, in the authentication portion 622, to confirm that the portable telephone set 10A of the user has been registered, referencing the community information DB 625 of the storage portion 624 (S102). Upon being authenticated, the registration request portion 121 of the portable telephone set 10A transmits to the community management server 60A request information, comprising the name of the relevant community and the initial members (S103). When the reception portion 621 receives the relevant request information, the community management server 60A uses the settings portion 623 to update the stored data in the community information DB 625 of the storage portion 624 according to the request information. The community management server 60A uses the transmission portion 626 to transmit the processing results as a response to the portable telephone set 10A.

(Content Distribution)

Figure 11:
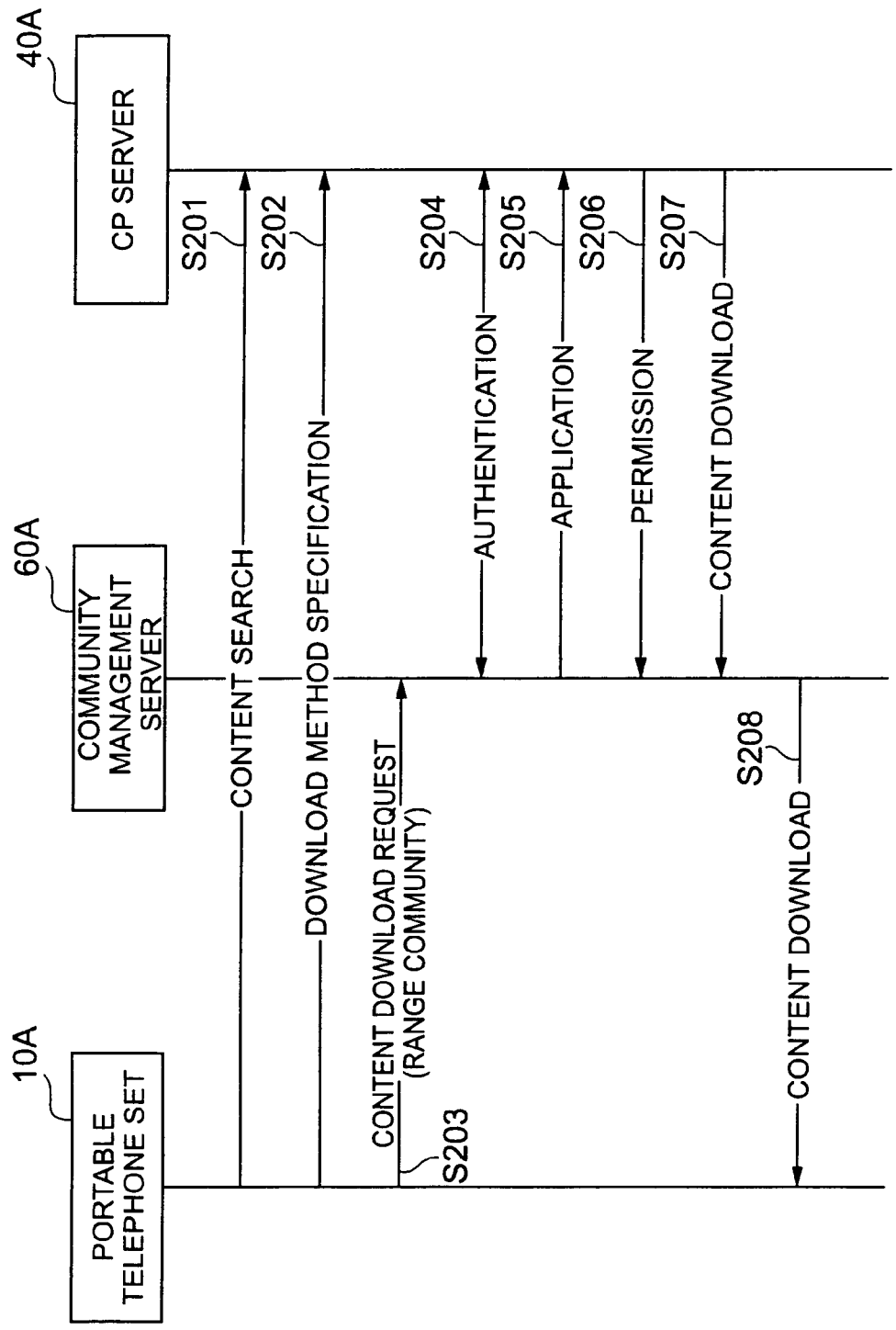
FIG. 11 is a sequence diagram showing operation when a portable telephone set initially downloads content from a CP server.

FIG. 11 is a sequence diagram showing operation when a portable telephone set initially downloads content from a CP server. As shown in FIG. 11, the distribution request portion 122 of the portable telephone set 10A transmits information to the CP server 40A to search for downloadable content (S201). Then, the distribution request portion 122 of the portable telephone set 10A specifies for the CP server 40A a download method for the relevant content (S202). Thereafter the distribution request portion 122 of the portable telephone set 10A transmits a content download request, comprising information indicating that the redistribution range of the relevant content is within the relevant community 1, to the CP server 40A via the GW 50A side community management server 60A (S203). Upon receiving the content download request, the community management server 60A receives authentication from the CP server 40A indicating that the content download request is genuine (S204), issues a content download request to the CP server 40A (S205), and after obtaining permission for content download from the CP server 40A (S206), receives the content download from the CP server 40A (S207). Upon receiving the content, the community management server 60A updates the stored data of the community information DB in the storage portion 624 using the settings portion 623, and then uploads the content to the portable telephone set 10A. The portable telephone set 10A, after receiving the content by means of the content reception portion 124, stores the content in the storage portion1 127 (S208).

(Content Redistribution through Permission Request from Content Member)

FIG. 12 is a sequence diagram showing operation when a content-member portable telephone set 10B not having content requests permission for content redistribution, and content redistribution is received from a content-member portable telephone set 10A having the content. That is, the operation described in FIG. 12 is operation in which the user of a portable telephone set 10B, who knows that the portable telephone set 10A belonging to the same community has received content distributed from the CP server 40A, receives redistribution of content from the portable telephone set 10A.

As shown in FIG. 12, when receiving content redistributed from the portable telephone set 10A, the portable telephone set 10B can access the community management server 60A on the side of the GW 50A by checking in to the community 1 (S301). In this case, the portable telephone set 10B transmits information comprising its own ID to the community management server 60A, and the authentication portion 622 of the community management server 60A references the community information DB 625 to authenticate the portable telephone set 10B as a proper user. Next, the portable telephone set 10B requests from the community management server 60A a list of content which can be downloaded by portable telephone sets belonging to community 1 (S302). After the user decides on the desired content, the portable telephone set 10B uses the redistribution permission request portion 123 to transmit to the community management server 60A on the side of the GW 50 a content download request, comprising information relating to its own ID and the community 1 to which it belongs.

The community management server 60A receives the content download request by means of the reception portion 621, and while referencing the community information DB 625 of the storage portion 624 confirms that the portable telephone set 10B belongs to the community 1 by means of the community registration confirmation portion 627 (S304). The community management server 60A also uses the requested content check portion 628 to reference the community information DB 625 of the storage portion 624 and confirm that the requested content can be redistributed to the community 1 (S305).

The community management server 60A, upon judging in the above steps S304 and S305 that content redistribution is possible, uses the notification portion 629 to generate a notification, for the portable telephone set 10A which is the content owner, that content downloading is to be performed, and the transmission portion 626 transmits the notification (S306). The community management server 60A uses the transmission portion 626 to send permission to the portable telephone set 10B in response to the content download request (S307). In step S306, the portable telephone set 10A, having received the notification from the community management server 60A by means of the redistribution notification reception portion 124, uses the redistribution content transmission portion 125 to transmit the relevant content, stored in the storage portion 127, to the portable telephone set 10B. The portable telephone set 10B receives the content by means of the redistribution content reception portion 126 (S308). The community management server 60A updates the data stored in the community information DB 625 of the storage portion 624 by means of the settings portion 623 (S309). If in step S304 the community registration confirmation portion 627 does not confirm that the portable telephone set 10B belongs to the community 1, or if in step S305 the requested content check portion 628 does not confirm that the requested content can be redistributed to the community 1, then the redistribution request is refused, the notification portion 629 generates a notification indicating that the redistribution request has been refused, and the transmission portion 626 transmits the notification to the portable telephone set 10B.

(Content Redistribution through Permission Request from Content Owner)

FIG. 13 is a sequence diagram showing operation when a content-owner portable telephone set 10A which possesses content requests permission for content redistribution, and content redistribution is performed to a content-member portable telephone set 10B not possessing the content. That is, operation is described for a case in which, in the operation described below in FIG. 13, the user of the portable telephone set 10A, which has received content distribution from the CP server 40A, presents content as a gift by redistributing content to the user of portable telephone set 10B, which belongs to the same community.

As shown in FIG. 13, when presenting content as a gift to the portable telephone set 10B, the portable telephone set 10A can access the community management server 60A on the GW 50A side by checking in to the community 1 (S401). In this case, the portable telephone set 100A transmits information comprising its own ID to the community management server 60A, and the authentication portion 622 of the community management server 60A references the community information DB 625 while authenticating the portable telephone set 10A as a proper user. Next, the portable telephone set 10A acquires information relating to redistributable content and to portable telephone sets to which redistribution is possible from the community management server 60A; this is explained below. After the user decides on the desired content and the content redistribution destination, the portable telephone set 10A uses the redistribution permission request portion 123 to transmit, to the community management server 60A on the GW 50 side, a content download request, comprising its own ID, the community 1 to which the sets belong, and information relating to the content redistribution destination (S402).

The community management server 60A receives the content download request by means of the reception portion 621, and uses the community registration confirmation portion 627 to reference the community information DB of the storage portion 624 while confirming that the portable telephone set 10B belongs to the community 1 (S403). Also, the community management server 60A uses the requested content check portion 628 to reference the community information DB of the storage portion 624 while confirming that the requested content can be redistributed to portable telephone set 10B belonging to the community 1 (S404).

The community management server 60A, upon judging in the above steps S403 and S404 that content redistribution is possible, uses the notification portion 629 to generate a notification for the portable telephone set 10A that downloading of the relevant content is to be performed, and the transmission portion 626 transmits the notification (S405). The community management server 60A uses the transmission portion 626 to send permission to the portable telephone set 10B for downloading of the relevant content (S406). The portable telephone set 10A, having received the notification from the community management server 60A of step S405 by means of the redistribution notification reception portion 124, employs the redistribution content transmission portion 125 to transmit the relevant content, stored in the storage portion 127, to the portable telephone set 10B. The portable telephone set 10B receives the transmitted content by means of the redistribution content reception portion 126 (S407). The community management server 60A updates the stored data in the community information DB 625 of the storage portion 624 by means of the settings portion 623 (S407). When in step S403 the community registration confirmation portion 627 has not confirmed that the portable telephone set 10B belongs to the community 1, or when in step S404 the requested content check portion 628 has not confirmed that the requested content can be redistributed to the community 1, the redistribution request is refused, the notification portion 629 generates a notification indicating that the redistribution request has been refused, and the transmission portion 626 transmits the notification to the portable telephone set 10A.

FIG. 14 through FIG. 16 are flow diagrams showing a more detailed example of the operation in FIG. 13. In the above operation, the portable telephone set 10A completes check-in to the community 1 with the community management server 60A, and then acquires information relating to redistributable content and portable telephone sets which can receive redistributed content from the community management server 60A, and searches the redistributable contents and destinations to decide on content. In this case, the user of the portable telephone set 10A performs a search using one of the methods described below, and decides on the type of redistribution to perform.

As shown in FIG. 14, in a first method, when the content download request in step S402 of FIG. 13 is transmitted to the community management server 60A, check-in is performed with the portable telephone set 10B specified as a transfer member, and a request is issued to search all the communities to which the portable telephone set 10B belongs (S4021a). In the authentication portion 622 of the community management server 60A, the portable telephone set 10B is specified as the transfer member, the community information DB 625 of the storage portion 624 is searched, and transferable content and all the communities to which the portable telephone set 10B belongs are retrieved (S4022a). Information relating to the transferable content or communities, obtained as a result of the search, is transmitted to the portable telephone set 10A, and is displayed on the display portion 106 of the portable telephone set 10A (S4023a). In the portable telephone set 10A, the desired content, or the community which is to be the source for transfers to the portable telephone set 10B, is specified, and transfer execution is requested (S4024a). Thereafter, the community management server 60A performs, in order, community registration authentication (S403 in FIG. 13) and requested content check (S404 in FIG. 13).

As shown in FIG. 15, in a second method, when the content download request of step S402 in FIG. 13 is transmitted to the community management server 60A, check-in is performed with the community 1 specified, and a request is performed to search for all content which can be downloaded to the community 1 (S4021b). In the authentication portion 622 of the community management server 60A, the community 1 is specified and the community information DB 625 of the storage portion 624 is searched, to retrieve all transferable content (S4022b). Information relating to the transferable content obtained as a result of the search is transmitted to the portable telephone set 10A, and is displayed on the display portion 106 of the portable telephone set 10A (S4023b). In the portable telephone set 10A, the desired content is specified and transfer execution is requested (S4024b). Thereafter, the community management server 60A confirms community registration (S403 in FIG. 13) and performs a requested content check (S404 in FIG. 13) in order.

As shown in FIG. 16, in a third method, when the content download request of step S402 in FIG. 13 is transmitted to the community management server 60A, the desired content is specified and check-in performed, and a request is issued to search for all portable telephone sets (members) to which the content can be transferred (S4021c). In the authentication portion 622 of the community management server 60A, the relevant content is specified, the community information DB 625 of the storage portion 624 is searched, and all members which can receive transfers are retrieved (S4022c). Information relating to the members which can receive transfers, obtained as a result of the search, is transmitted to the portable telephone set 10A, and is displayed on the display portion 106 of the portable telephone set 10A (S4023c). In the portable telephone set 10A, the desired member for transfer is specified, and transfer execution is requested (S4024c). Then, the community management server 60A performs community registration confirmation (S403 in FIG. 13) and a requested content check (S404 in FIG. 13) in order.

According to the present embodiment, the registration request portion 121 of the portable telephone set 10A issues a request to the community management server 60A to register the portable telephone sets 10B, 10C belonging to the same community in association with the community, and the community information DB 625 of the storage portion 624 of the community management server 60A performs community registration according to this registration request, so that community registration can be performed between the portable telephone set 10A and the community management server 60A.

According to the present embodiment, the community information DB 625 registers a plurality of portable telephone sets 10A to 10C belonging to the same community in association with the community; the reception portion 621 receives, from any one of the portable telephone sets 10A to 10C, a request for redistribution of content from portable telephone set 10A, to which content has been distributed from the CP server 40A, to portable telephone set 10B; the community registration confirmation portion 627 confirms that the redistribution request is for redistribution between portable telephone sets 10A to 10C belonging to the same community and registered in the community information DB 625; and when the redistribution request is confirmed to be for redistribution between portable telephone sets 10A to 10C belonging to the same community, the notification portion 629 notifies the portable telephone set 10A that content is to be redistributed from the portable telephone set 10A to the portable telephone set 10B; hence confirmation that the content redistribution is within the same community can be performed solely between the communication terminals and the community management server, and content can be redistributed directly between communication terminals belonging to the same community, without intervention of a transmission server.

That is, according to the present embodiment, by having the CP server 40A entrust the community management server 60A with permission for secondary redistribution of content, reductions in the number of accesses of the CP server 40A and in the number of downloads from the CP server 40A can be promoted, and the burden on the CP server 40A can be alleviated. Further, according to the present embodiment, comprehensive applications and permissions relating to secondary redistribution of content within a community are enabled, so that the procedure for content acquisition can be simplified for secondary redistribution users.

The community management server, communication terminal, content transmission system, and content transmission method of this invention are not limited to the above-described embodiment, and of course various modifications can be made without deviating from the gist of the invention.

For example, in the above embodiment, an explanation was mainly given of a mode in which one of the portable telephone sets belonging to the same community transmits a request for content redistribution to a community management server, and content redistribution is performed between portable telephone sets belonging to the community; however, this invention is not limited to such a mode. For example, a mode is possible in which, based on a content redistribution request from a portable telephone set not belonging to the relevant community, content redistribution can be performed between portable telephone sets belonging to the relevant community. In this case, when there is a gift of content from the user of the portable telephone set not belonging to the relevant community to one portable telephone set belonging to the relevant community, the gift of the content can also be given to other portable telephone sets belonging to the relevant community, so that the possibilities for community use can be further expanded.

What is claimed is:

1. A community management system comprising: a first communication terminal configured to directly distribute content;
   a second communication terminal configured to directly receive the content distributed by the first communication terminal; and
   a community management server configured to facilitate communication between the first communication terminal and the second communication terminal in a community of communication terminals,
   the community management server including:
   a registration unit configured to register the first communication terminal and the second communication terminal as communication terminals belonging to the same community, among a plurality of communication terminals, in association with the community;
   a reception unit configured to receive, from the first communication terminal, a request for redistribution of the content from the registered first communication terminal, to which the content has been distributed from a transmission server, to the registered second communication terminal;
   a confirmation unit configured to confirm whether the content redistribution request received by the reception unit is for redistribution between communication terminals belonging to the same community of communication terminals registered by the registration unit; and
   a notification unit configured to notify the registered first communication terminal that redistribution of the content is to be performed from the registered first communication terminal to the registered second communication terminal when the confirmation unit has confirmed that the content redistribution request is for redistribution between communication terminals belonging to the same community, and
   the first communication terminal including, a distributing unit configured to distribute the content directly to the second communication terminal, without going through the community management server, according to the notification notified from the community management server.

2. The community management system according to claim 1, wherein
   the reception unit receives, from the first and second communication terminals, a request for registration of the first and second communication terminals belonging to the same community, in association with the community,
   and the registration unit, in response to the registration request received by the reception unit, registers the first and second communication terminals belonging to the same community in association with the community.

3. The community management system according to claim 1, wherein the first communication terminal comprises:
   a redistribution request unit configured to transmit, to the community management server, the request for redistribution of content from the first communication terminal, which has received distribution of the content from the transmission server, to the second communication terminal.

4. The community management system according to claim 1, wherein the first communication terminal comprises:

a redistribution notification reception unit configured to receive, from the community management server, notification that redistribution of the content from the first communication terminal to the second communication terminal is to be performed; and the distributing content unit configured to transmit the content to the second communication terminal when the redistribution notification reception unit has received notification of the performance of redistribution of the content.

5. The community management system according to claim 1, wherein a transmission server, the community management server, and the first and second communication terminals are interconnected in a communication network, and the content is distributed from the transmission server to the first communication terminal via the communication network.

6. A content transmission method in a system in which a transmission server, first and second communication terminals in a community of communication terminals, and a community management server are interconnected in a communication network, and content is distributed from the transmission server to the first communication terminal via the communication network, the content transmission method comprising:

registering, by the community management server, the first and second communication terminals belonging to the same community in association with the community, wherein the first communication terminal is configured to distribute content and the second communication terminal is configured to directly receive the content distributed by the first communication terminal;

transmitting, from the first communication terminal, a redistribution request to the community management server requesting redistribution of content from the first communication terminal, which has received distribution of the content from the transmission server, to the second communication terminal;

confirming, by the community management server, whether the received content redistribution request is for redistribution between registered communication terminals belonging to the same community of communication terminals;

notifying, by the community management server when the content redistribution request is confirmed to be redistribution between communication terminals belonging to the same community in the first communication terminal of the performance of redistribution of the content from the first communication terminal to the second communication terminal; and distributing, directly from the first communication terminal to the second communication terminal without going through the community management server, the content according to the notification notified from the community management server.

* * * * *